United States Patent [19]
Titmas et al.

[11] Patent Number: 5,190,665
[45] Date of Patent: Mar. 2, 1993

[54] PROCESS AND APPARATUS FOR REMOVING CARBON DIOXIDE AND STRIPPING ANOTHER COMPONENT FROM A LIQUID STREAM

[76] Inventors: James A. Titmas, 347 Crain Ave., Kent, Ohio 44240; Phillip J. Flauto, 2205 E. Streetsboro Rd., Hudson, Ohio 44326

[21] Appl. No.: 743,918

[22] Filed: Aug. 12, 1991

[51] Int. Cl.[5] .............................................. B01D 19/00
[52] U.S. Cl. ......................................... 210/743; 55/44; 55/51; 55/68; 55/71; 210/750; 210/808; 210/903
[58] Field of Search ...................... 423/238, 352; 55/46, 55/51, 53, 55, 70, 38, 40, 43, 44, 68; 210/188, 743, 761, 806, 808, 903, 750, 766

[56] References Cited

U.S. PATENT DOCUMENTS

| | | | |
|---|---|---|---|
| 2,642,393 | 6/1953 | Gehm et al. | 210/188 |
| 2,872,415 | 2/1959 | Schleyer et al. | 210/758 |
| 3,410,054 | 11/1968 | Deiters | 55/70 |
| 3,804,757 | 4/1974 | Ruschenburg | 210/805 |
| 3,880,615 | 4/1975 | Grunewald et al. | 55/44 |
| 3,920,419 | 11/1975 | Schroeder et al. | 55/70 |
| 3,972,693 | 8/1976 | Wiesner et al. | 55/70 |
| 4,049,782 | 9/1977 | Wohler et al. | 423/238 |
| 4,058,375 | 11/1977 | Lawrence | 55/70 |
| 4,060,591 | 11/1977 | Garber et al. | 423/352 |
| 4,093,544 | 6/1978 | Ross | 210/806 |
| 4,302,430 | 11/1981 | Weber et al. | 423/234 |
| 4,311,597 | 1/1982 | Bhattacharyya | 210/731 |
| 4,396,463 | 8/1983 | Josis et al. | 203/10 |
| 4,464,228 | 8/1984 | Roensch | 203/49 |
| 4,657,680 | 4/1987 | Zibrida | 210/713 |
| 4,668,250 | 5/1987 | Drese | 55/70 |
| 4,689,156 | 8/1987 | Zibrida | 210/747 |
| 4,765,900 | 8/1988 | Schwoyer et al. | 210/603 |
| 4,792,408 | 12/1988 | Titmas | 210/747 |
| 5,122,165 | 6/1992 | Wang et al. | 55/51 |

Primary Examiner—Robert A. Dawson
Assistant Examiner—Joseph Drodge
Attorney, Agent, or Firm—Renner, Kenner, Greive, Bobak, Taylor & Weber

[57] ABSTRACT

The continuous treatment of a liquid stream for removing a selected component therefrom, includes depressurizing the liquid stream to remove carbon dioxide, forming a carbon dioxide stream and a component-laden stream (17); raising the pH of the component-laden stream (17) to form a pH adjusted stream (19); gas-stripping the component-laden, pH adjusted stream (19) with a counterflow stripping gas (73) in a stripping column (20) having a plurality of deflection cones (111) over which the pH adjusted stream (19) is sprayed, to remove the component therefrom and thereby forming a relatively component-free liquid stream (50) and a gaseous component stream (21); cooling the carbon dioxide stream; neutralizing the liquid component stream (21) with the cooled carbon dioxide stream (64); cooling the gaseous component stream (21); re-heating the gaseous component stream to form a heated stream (35) and dissolving the heated gaseous component stream (35) in an acidic solution in a re-absorption column (36) forming a reduced gas stream (40) and a liquid salt complex stream (37) of the component; and utilizing the reduced component gas stream (40) to remove the component in the gas-stripping step.

10 Claims, 5 Drawing Sheets

PROCESS AND APPARATUS FOR REMOVING CARBON DIOXIDE AND STRIPPING ANOTHER COMPONENT FROM A LIQUID STREAM

TECHNICAL FIELD

This invention relates to a process and apparatus for removing ammonia or other component from a liquid stream, such as a products or waste stream from a wet oxidation process. More particularly, the present invention relates to a process and apparatus for removing a component from a liquid stream wherein a stripping column is in series with a re-absorption column, such that the relatively component-free gas stream exiting the re-absorption column is used as the stripping gas stream in the stripping column. Also, the present invention relates to a stripping and a re-absorption column, each having a series of stacked nozzles such that the liquid flow of each column is caused to counterflow with respect to the gas stream therein. The process and apparatus of the invention include a closed, integrated system except for removal of useful by-products.

BACKGROUND ART

The present invention has particular application to the removal of ammonia from high pressure, high temperature ammonia laden waste or products streams. Such streams are encountered in a variety of processes, including those involving wet oxidation. For example, U.S. Pat. No. 4,792,408 discloses a method and apparatus for enhancing chemical reactions at supercritical conditions. That patent teaches that the speed and efficiency of many chemical reactions can be increased by subjecting the reactants to increased temperature and pressure conditions. This produces a fluid products stream having high temperature and pressure, and, as known in the art, a stream which is often laden with ammonia. U.S. Pat. No. 4,792,408 is incorporated by reference herein for whatever disclosure is necessary with respect to an exemplary wet oxidation method and apparatus.

It is environmentally beneficial, and often required for regulatory purposes, that ammonia be removed or substantially reduced from waste and products streams before final disposal. To this end, it has been known to gas-strip ammonia from such streams. Several factors influence the solubility of ammonia in water, and hence the efficiency of the gas separation techniques, including temperature, pressure, pH and the area of contact between the stripping gas and the liquid.

When stripping or scrubbing a gas such as ammonia from a liquid, it is known that the greater the area of contact between the stripping gas (such as air) and the liquid, the greater is the efficiency of the removal of the ammonia from the solution. One method of increasing the area of contact has included a series of baffles wherein the fluid stream cascades over the baffles.

For a general discussion of gas absorption, such as ammonia stripping, see *Chemical Engineer's Handbook*, Perry, ed., McGraw-Hill Book Company, pg. 668 et seq. (1950) which is hereby incorporated by reference to the extent necessary for an understanding and disclosure of gas absorption.

The pressures above a liquid having a gas dissolved therein, directly influences the solubility of the gas in the liquid. The lower the pressure, the lower the solubility. The stripping of ammonia at pressures lower than ambient is known in batch processes. Continuous stripping processes are known, and have included spraying the fluid onto the top of a packed tower with trickle down and gas counterflow, and further using a closed loop gas flow to reduce the risk of environmental contamination. The trickle down, closed loop systems heretofore known in the art, have been slow passive processes because there is still a need to remove the water vapor from the gas loop.

Therefore, there is a need for a fluid treatment process and apparatus for the continuous, active treatment of a fluid products stream.

DISCLOSURE OF THE INVENTION

It is therefore, an object of the present invention to provide a continuous, liquid stream treatment process.

It is another object of the present invention to provide an apparatus for the efficient treatment of a fluid waste or products stream.

It is yet another object of the present invention to provide a process and apparatus, as above, which includes wet oxidation and subsequent removal of ammonia from the products stream thereof.

These and other objects of the present invention, together with the advantages thereof over the known art relating to liquid waste and products stream treatment, which shall become apparent from the specification which follows, are accomplished by the invention as hereinafter described and claimed.

In general, the present invention provides a process for treating a liquid stream and removing a component therefrom. The process includes the steps of depressurizing the products stream to remove carbon dioxide, forming a carbon dioxide stream and a component-laden stream; raising the pH of the component-laden stream; gas-stripping the component-laden stream to remove the component therefrom thereby forming a relatively component-free liquid stream and a gaseous component stream; neutralizing the liquid component stream with the carbon dioxide stream; dehumidifying the gaseous component stream; dissolving the gaseous component stream in an acidic solution by re-absorption forming a reduced component gas stream and a liquid salt complex of the component; and utilizing the reduced component gas stream to remove the component in said gas-stripping step.

The present invention also includes an apparatus for processing a continuously flowing fluid material to remove a component therefrom. The apparatus includes a stripping column. A gas stream is introduced near the top of the stripping column and means are provided to introduce the fluid material into the bottom of the stripping column. Means are also provided to contact the gas stream and the fluid material in counterflow to strip the component from the fluid material, which includes a plurality of stacked nozzles each having a deflection cone and means to spray the fluid material past each deflection cone. A reservoir is associated with each of the nozzles to collect the fluid material. Means are provided to convey the fluid material from the reservoir to the next nozzle, and means are also provided to remove the component-laden gas flow from near the bottom of the stripping column, and to remove the reduced component fluid material from near the top of the column.

PREFERRED EMBODIMENT FOR CARRYING OUT THE INVENTION

Figure 1:
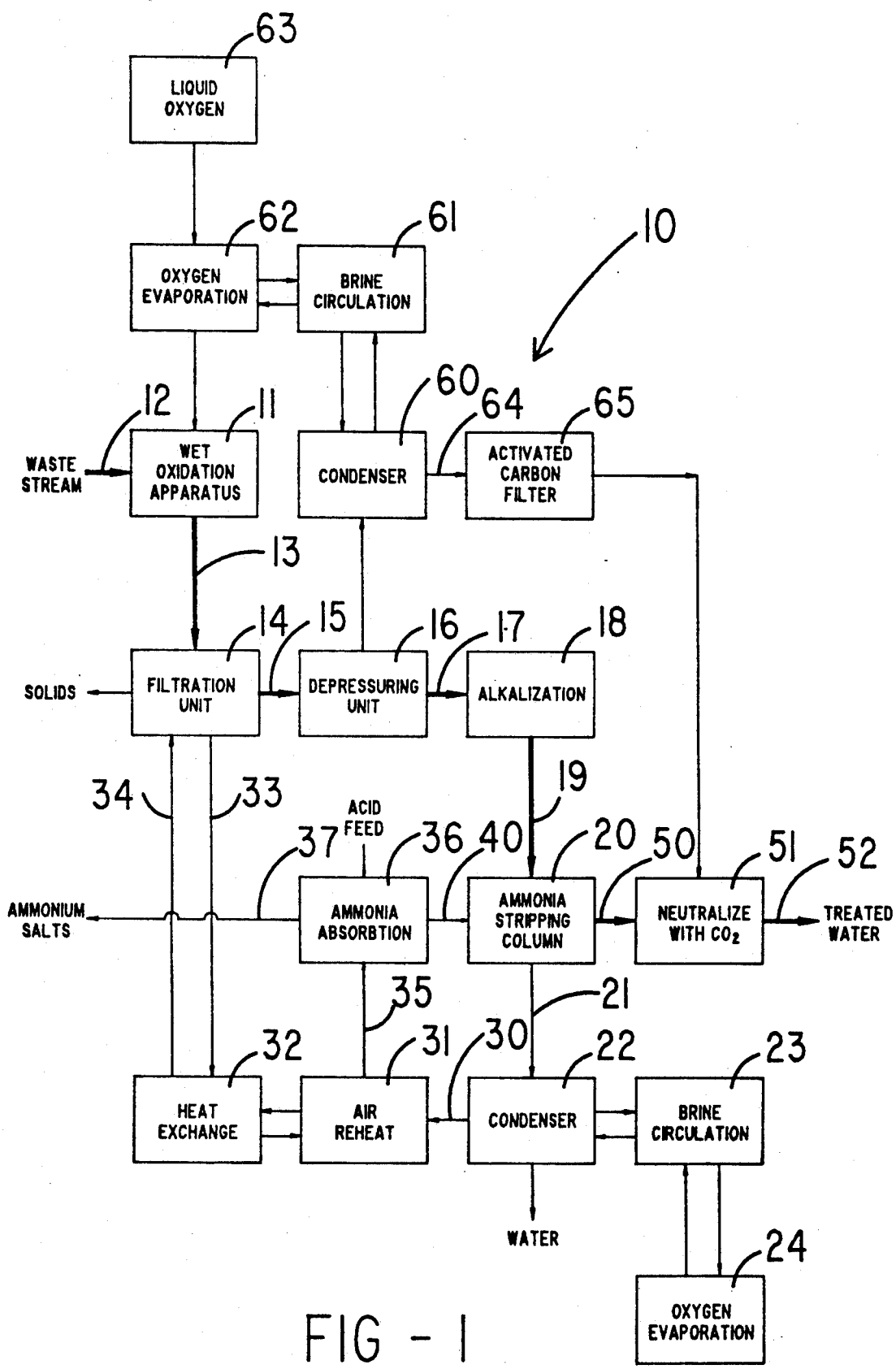
FIG. 1 is a schematic, block diagram of a system for removing a gas such as ammonia from a liquid stream, according to the concepts of the present invention.

FIG. 1 of the attached drawings is a schematic representation of the system according to the present invention, generally indicated by the numeral 10. A wet oxidation apparatus 11 receives a reactant stream 12 such as a waste sludge stream from a waste, activated biological domestic sewage treatment process. Wet oxidation apparatus 11 may be any such device known in the art, such as that disclosed in U.S. Pat. No. 4,792,408, incorporated by reference hereinabove. Furthermore, while the invention herein has particular application to wet oxidation and to the products stream therefrom, one skilled in the art will understand its applicability to other processes having a waste or products stream which are equally within the scope of the present invention. For ease of the following discussion and claims, the term "products stream" is understood to include all such streams, whether waste or not, and whether or not from a wet oxidation process. Furthermore, while the invention herein is useful to remove ammonia from a liquid stream, it has applicability to the removal of a variety of other components from such streams, as will be appreciated by those skilled in the art. For the sake of this disclosure, the invention will be exemplified by reference to ammonia stripping.

The products stream 13 exiting from wet oxidation apparatus 11 is often ammonia laden, as known in the art. Products stream 13 is first filtered such as by a filtration unit 14, to remove suspended solids, which are also often present in products streams, thus producing filtered stream 15. Filtration unit 14 may be any such unit conventional in the art. A depressurization unit 16, also commonly known in the art, is used to depressurize filtered stream 15 and thereby remove carbon dioxide, which is known to effervesce from liquids at lower pressures.

The depressurized stream 17 from unit 16 is then tested and adjusted for pH at the alkalization unit 18. Alkalization unit 18 may include separate pH monitoring and alkalizing means or the actual alkalization may be automatically controlled by the pH monitor (not shown) in alkalization unit 18. Preferably, the pH of the depressurized stream 17 is adjusted as necessary to a pH of from about 8 to about 9.2 with about 8.8 being preferred. Of course, as will be appreciated by those skilled in the art, pH and other process conditions of the invention will vary, depending upon the nature of the stream to be treated, the component or components removed, and the like. The pH adjusted stream 19 is then sent to a gas-liquid separation, or stripping column 20, where ammonia is stripped from the liquid, pH adjusted stream 19. Products stream 13, if exiting from wet oxidation apparatus 11, will normally be at an elevated temperature. For separation efficiency, especially for ammonia removal, the temperature within stripping column 20 is maintained at about 90° C. It is further preferred that the pressure within stripping column 20 be sub-atmospheric.

As will be hereinafter more fully described, an ammonia laden gas stream 21 exits ammonia stripper 20, and is dehumidified by cooling to about 15° C. at condenser 22. Cooling may be by any means known in the art, such as by use of a brine circulation unit 23 and an oxygen evaporator 24. Because ammonia has a boiling point more than 133° C. below that of water, cooling the ammonia laden stream to about 15° C. causes most of the water in ammonia laden stream 21 to condense out, such that a gaseous water-free ammonia stream 30 exits condenser 22.

Water-free ammonia stream 30 is then sent to heater 31, wherein the stream is again heated, to about 10° C. or ambient temperature. The heat necessary to heat cooled stream 30 in heater 31 is preferably obtained by cooling hot fluid from wet oxidation apparatus 11, such as by use of a heat exchanger 32 and circulation conduits 33 and 34. The heated stream 35 leaving heater 31 is next sent to a re-absorption column 36, wherein the ammonia is dissolved in an acidic solution, and withdrawn as dissolved ammonium salt stream 37. For efficiency of re-absorption, the temperature within re-absorption column 36 is maintained at about ambient temperature, and the pressure therein at above atmospheric.

A gas stream 40 exits re-absorption column 36 and is used to supply the gas-flow used in the ammonia stripping in stripping column 20, thereby closing the loop of the gas flow between stripping column 20 and re-absorption column 36. As will be more fully addressed hereinbelow, the amount of ammonia present in gas stream 40 may be varied depending upon the concentration desired.

Also exiting from stripping column 20, is an alkaline, ammonia free stream 50. Alkaline, ammonia free stream 50 is preferably neutralized with carbon dioxide at tank 51, which can then be removed as neutralized stream 52. The carbon dioxide necessary to neutralize alkaline, ammonia free stream 50 preferably comes from depressurizing unit 16. The carbon dioxide from depressurizing unit 16 is first cooled at condenser 60 to condense water vapor, by any known technique, such as another brine circulation unit 61 and oxygen evaporation unit 62, which is supplied by a liquid oxygen supply tank 63. The condensed carbon dioxide stream 64 is then filtered by a carbon filter 65 to remove volatile organic carbons, and conveyed to neutralization tank 51.

Figure 2:
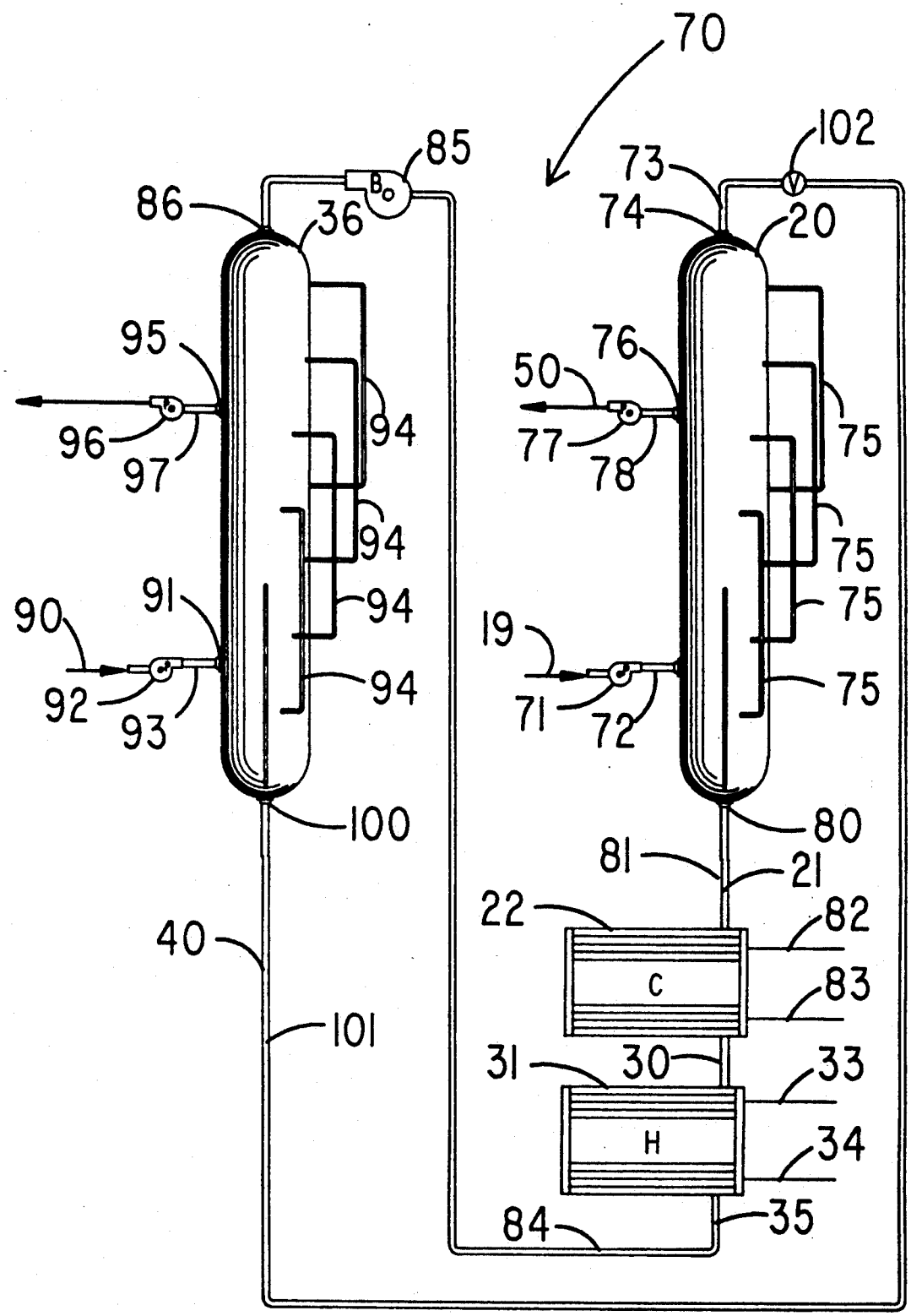
FIG. 2 is a partially schematic, front elevational view of a portion of the system in FIG. 1, showing a gas stripping column and a re-absorption column in series.

FIG. 2 is a more detailed view of the ammonia stripping and re-absorption system, generally designated by the numeral 70. Alkalized stream 19 is conveyed, such as by pump 71, through conduit 72, to the bottom portion of stripping column 20. A stripping gas stream 73 (FIG. 3), such as an air stream, is drawn through the top of stripping column 20 at gas input opening 74 (FIG. 2). A plurality of recirculation conduit pipes 75 are used to effect counterflow between the gas entering at opening 74 and pH adjusted stream 19 entering stripping column 20 through conduit 72, as will be more fully discussed hereinbelow. Liquid, alkaline, relatively ammonia-free stream 50 exits stripping column 20 at point 76, such as by use of pump 77 through conduit 78. By "relatively"

ammonia-free it is understood to mean a stream from which some amount of ammonia has been removed, and does not necessarily imply that all or relatively all of the ammonia has been removed.

Ammonia laden gas stream 21 exits stripping column 20, such as at exit point 80, through conduit 81. Ammonia laden stream 21 then enters condenser 22, where it is cooled so that water condenses therefrom as discussed hereinabove. Input and output streams 82 and 83, respectively, (FIG. 2) may be employed to provide cooling to condenser 22, such as by use of brine circulation unit 23 and oxygen evaporator 24 as shown in FIG. 1.

Water-free, ammonia-laden stream 30 is then heated in heater 31, the heat for which may be supplied by wet oxidation apparatus 11 via conduits 33 and 34 as was previously described. Exiting heater 31, heated, ammonia laden gas stream 35 is conveyed, such as via conduit 84 and pump 85, to the top of re-absorption column 36, where it enters through input point 86.

An acid solution stream 90, preferably a solution of concentrated sulfuric or nitric acid, is fed into re-absorption column 36 near the bottom thereof, such as at input point 91 by use of pump 92 through conduit 93. Although it is desired to employ a concentrated sulfuric or nitric acid solution, one skilled in the art will appreciate that other acids of various concentrations are useful for the present invention, and therefore, which are within the scope thereof. Ammonia-laden gas stream 35 is contacted with acid solution stream 90 in a countercurrent flow therebetween, such as by use of a plurality of recirculation conduit pipes 94, and as will be more fully addressed hereinbelow. The reaction of the ammonia-laden gas stream 35 with acid solution stream 90, results in an ammonium salt, as will be appreciated by those skilled in the art. For example, if sulfuric acid is employed, the reaction results in an ammonium sulfate. If the component removed is other than ammonia, then a different liquid salt complex of the component will result, which is equally within the scope of the invention.

An ammonia-salt laden or other salt complex laden liquid stream is removed from re-absorption column 36, such as through exit point 95 using pump 96 via conduit 97. This stream may then be reclaimed of its ammonium salt content.

The gas stream from which ammonia has been removed in re-absorption column 36, which is gas stream 40 in FIG. 1, is removed at exit point 100 and recirculated via conduit 101 to input opening 74 of stripping column 20, wherein it is used to again strip ammonia, as discussed hereinabove. Thus, there is a closed loop with respect to the gas stripping stream in stripping system 70. As will be appreciated by one skilled in the art, various valves may be employed to control pressure and flow rates and the like within stripping system 70. For example, a pressure valve 102 may be placed in conduit 101 to control the flow rate and pressure of stripping gas stream 73 entering stripping column 20. As will be understood from this disclosure, with the closed loop system described herein and depicted in FIG. 2, streams 40 and 73 are the same stream.

Figure 3:
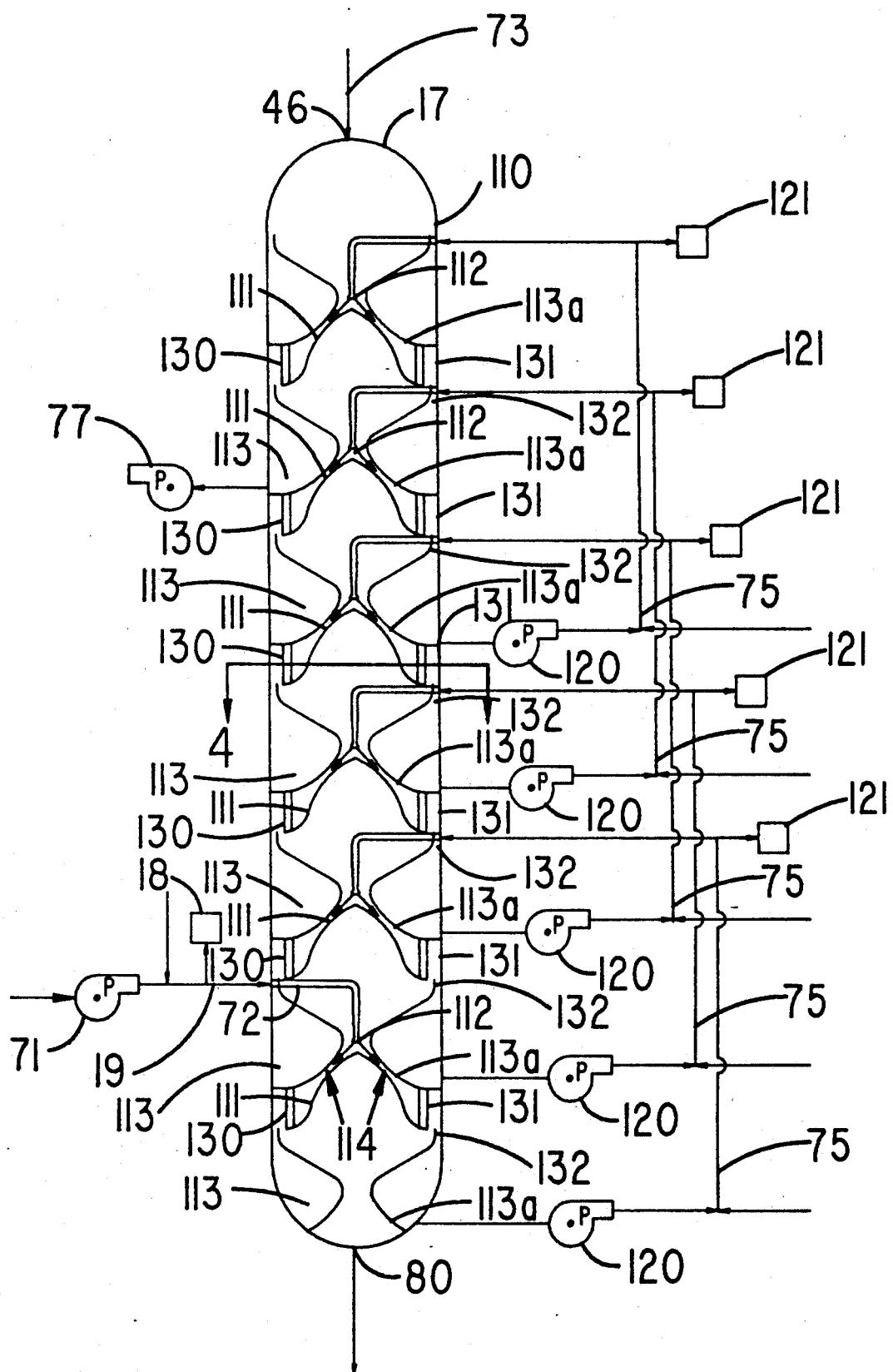
FIG. 3 is a vertical cross section and schematic showing the operation of one of the columns in FIG. 2.

More of the details of stripping column 20 are shown in FIG. 3. Preferably, column 20 includes a containment casing 110, within which are stacked a plurality of deflection cones 111. Re-absorption column 36 is preferably identical in structure to stripping column 20 as depicted in FIG. 3, and it is to be understood that the following discussion with respect to the structure of stripping column 20 has equal application to re-absorption column 36.

After being adjusted to proper pH at alkalization unit 18 (FIG. 1), pH adjusted stream 19 enters stripping column 20 through conduit 72 (FIG. 3), preferably at some point proximate to the bottom deflection cone 111, as shown in FIG. 3. At the end of conduit 72, a spray nozzle 112 sprays pH adjusted stream 19 over the apex of deflection cone 111. A reservoir 113 is associated with each deflection cone 111, such that pH adjusted stream 19 runs past deflection cone 111 and into reservoir 113.

Figure 5:
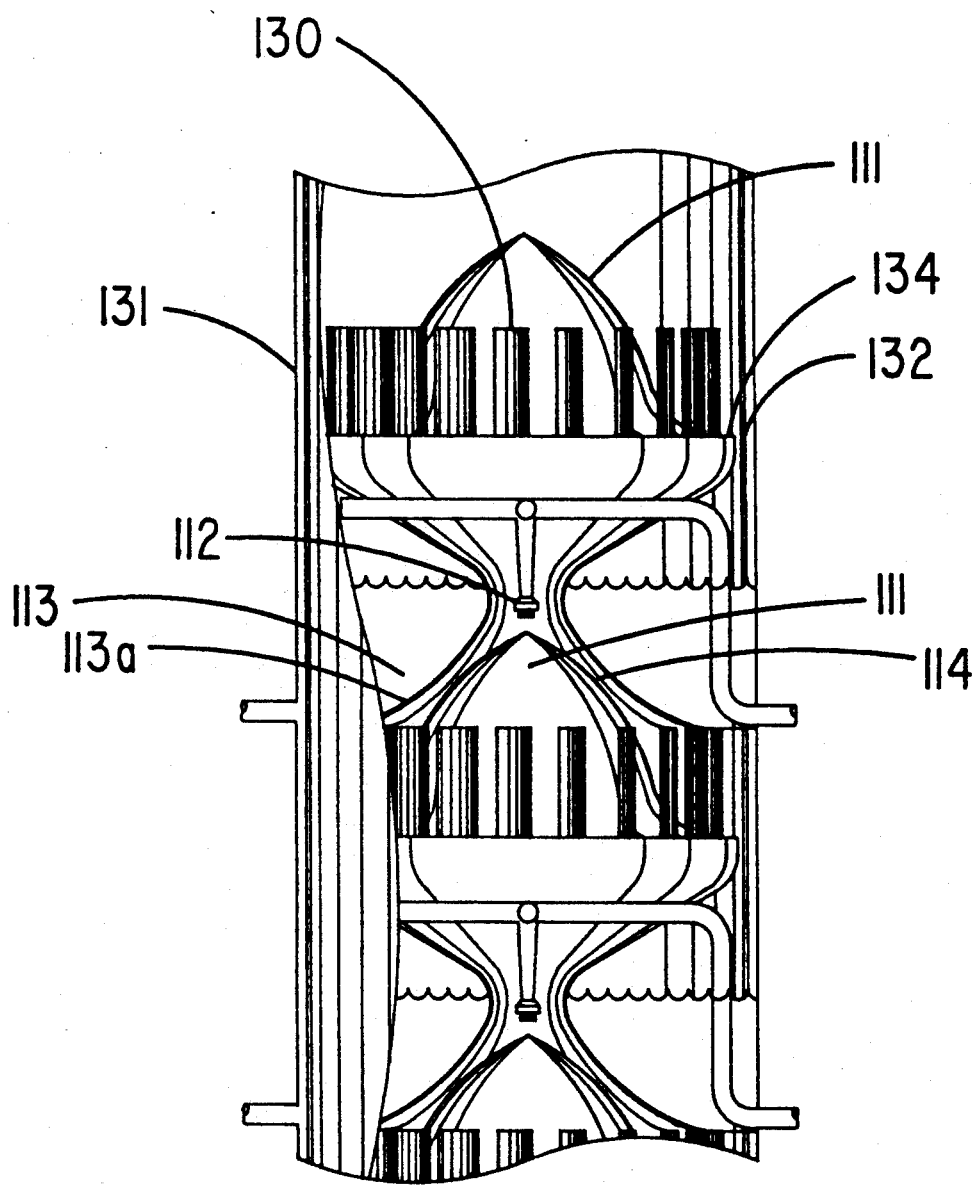
FIG. 5 is a close-up, side elevational view, partly broken away showing a portion of the column of FIG. 3.

It is preferred that as pH adjusted stream 19 is sprayed past deflection cone 111, it is forced through a venturi throat 114, formed for example, between deflection cone 111 and the outer wall 113a of the reservoir 113 immediately thereinabove (FIG. 5). By way of example, the pressure of pH adjusted stream 19 leaving the first spray nozzle 112 is about 0.8 atmospheres. Venturi throat 114 creates a condition of low pressure which is useful in ammonia stripping.

Gas stripping stream 73 is drawn into the top of stripping column 20, and flows toward the bottom thereof. As pH adjusted stream 19 is sprayed past deflection cones 111, the area of contact between pH adjusted stream 19 and gas stream 73 is increased, which also increases the efficiency of the ammonia stripping.

By use of recirculation pumps 120, the liquid collected in each reservoir 113 is removed and recirculated via recirculation conduit pipes 75 (shown schematically in FIG. 3) to the next deflection cone 111, wherein it is again sprayed by a spray nozzle 112 past a deflection cone 111. It is to be appreciated that upon each successive recirculation to the next deflection cone 111, pH adjusted stream 19 is brought into contact with a portion of gas stream 73 which is less laden with ammonia than the portion of gas stream 73 with which pH adjusted stream 19 was previously in contact. Hence, the counterflow between pH adjusted stream 19 and gas stream 73 enhances separation of ammonia.

This recirculation continues until the last deflection cone 111, whereupon the stripped, ammonia-reduced liquid is removed by pump 77. Additional pH monitors 121 may also be employed in conjunction with recirculation pumps 120 and conduit pipes 75, such that as the ammonia stripped liquid is being recirculated, its pH is monitored and adjusted as necessary. As interchangeably used herein, "reduced" or "ammonia reduced" is understood to mean a stream from which ammonia has been removed or substantially removed. As will be appreciated by one skilled in the art, the amount of ammonia removed is dependent upon a number of factors, including the number of spray nozzle stages, pressures, temperatures and the like. Therefore, the amount of ammonia removal at any stage of the invention, including in gas stream 40 and relatively ammonia-free stream 50, may be varied as desired, from a slight amount to almost complete removal. Any such removal is within the scope of the present invention.

The stripping gas stream 73 exits the bottom of stripping column 20 at exit point 80 as ammonia-laden gas stream 21, whereupon it is conveyed to condenser 22 as discussed hereinabove.

Figure 4:
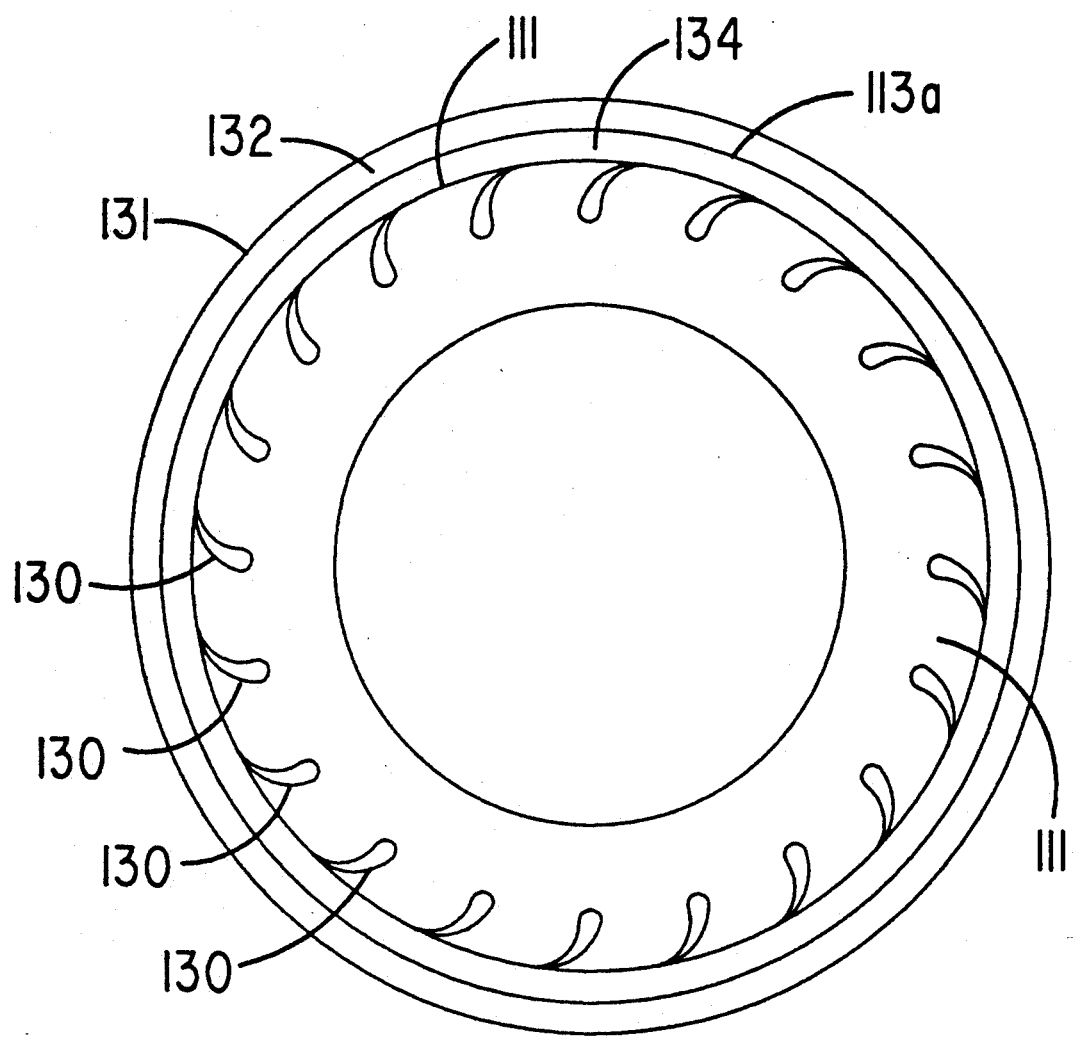
FIG. 4 is a sectional view taken substantially along line 4—4 of FIG. 3.

Preferably, as best shown in FIG. 4, after pH adjusted stream 19 is sprayed through venturi throat 114, it is then directed over a series of fins 130 on deflection cones 111, which are configured so as to cause pH adjusted stream 19 to vortically flow toward reservoir 113 through an annulus 132. The vortically directed flow causes the pH adjusted stream 19 to be forced to the outer wall 131 of stripping column 20, thus further increasing the separation efficiency. The centrifugal forces due to the vortical flow cause the heavier liquid to be forced to outer wall 131, while the lighter gases remain in the flow of gas stream 73. The pH adjusted stream 19 then flows through annulus 132 and into reservoir 113. The gas stream, containing stripping gas 73 and the stripped component in gaseous state, flows through an annulus 134 between deflection cone 111 and reservoir 113.

By way of example, if pH adjusted stream 19 enters stripping column 20 with an ammonium concentration of about 1500 milligrams/liter, relatively ammonia-free stream 50 would be expected to have less than 300 milligrams/liter of ammonia. Furthermore, ambient temperature stream 35 would have an ammonium concentration of about 153,000 milligrams/liter. The ammonium salt-laden liquid stream removed from re-absorption column 36 would have an ammonium concentration of 200,000 milligrams/liter.

These examples are based upon a flow rate of 300 gallons/minutes of pH adjusted stream 19 being sprayed from the first spray nozzle 112, and 30 gallons/minutes of ammonium salt effluent being removed from re-absorption column 36. As discussed hereinabove, the amount of ammonia removal may be varied as desired.

Thus it should be evident that the device and method of the present invention are highly effective in treating a waste or products stream flow, especially for the removal of ammonia therefrom. The invention is particularly suited for use in removing ammonia from wet oxidation reactors, but is not necessarily limited thereto, and may be employed to remove a variety of components from a fluid stream. The device and method of the present invention can be used separately with other equipment, methods and the like, and for any stripping application in addition to ammonia stripping.

Based upon the foregoing disclosure, it should now be apparent that the use of the method and apparatus described herein will carry out the objects set forth hereinabove. It is, therefore, to be understood that any variations evident fall within the scope of the claimed invention and thus, the selection of specific component elements can be determined without departing from the spirit of the invention herein disclosed and described. Thus, the scope of the invention shall include all modifications and variations that may fall within the scope of the attached claims.

We claim:

1. A process for continuously treating a liquid stream and for removing a selected component therefrom, the process for treating comprising the steps of depressurizing the liquid stream to remove carbon dioxide and forming a carbon dioxide stream and a component-laden stream; raising the pH of said component-laden stream; gas-stripping said component-laden stream with a stripping gas to remove the component therefrom thereby forming a relatively component-free liquid stream and a gaseous component stream; neutralizing said relatively component-free liquid stream with said carbon dioxide stream; dehumidifying said gaseous component stream; dissolving said gaseous component stream in an acidic solution by re-absorption forming a reduced component gas stream and a liquid salt complex of the component; and utilizing said reduced component gas stream to remove the component in said gas-stripping step.

2. A process as in claim 1, wherein in said pH raising step the pH of said component laden stream is raised to from about 8.8 to about 9.2.

3. A process as in claim 1, wherein said carbon dioxide stream is filtered to remove volatile organic carbons, before being said step of neutralizing said relatively component-free stream.

4. A process as in claim 1, wherein said gaseous component stream is cooled to about 15° C.

5. A process as in claim 4, wherein said gaseous component stream is reheated after said cooling step and the heat necessary for said step of re-heating said gaseous component stream is supplied by a wet oxidation process.

6. A process as in claim 1, comprising an initial step of filtering suspended solids from the liquid stream.

7. A process as in claim 1, wherein said step of gas-stripping said component-laden stream includes the step of circulating said component-laden stream in counterflow with said stripping gas.

8. A process as in claim 1, including the further step of monitoring the pH of said component-laden stream and adjusting as necessary to a pH of about 9.

9. A process as in claim 1, wherein the component is ammonia.

10. A process as in claim 9, wherein said acidic solution is selected from the group consisting of concentrated sulfuric acid solutions and concentrated nitric acid solutions.

* * * * *